UNITED STATES PATENT OFFICE.

TILLMAN D. LYNCH, OF WILKINSBURG, AND JOHN J. CRANE, OF SWISSVALE, PENNSYLVANIA, ASSIGNORS, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

COMPOSITION OF MATTER.

932,622.     Specification of Letters Patent.     Patented Aug. 31, 1909.

No Drawing.     Application of Letters Patent filed January 10, 1908. Serial No. 410,226.

*To all whom it may concern:*

Be it known that we, TILLMAN D. LYNCH and JOHN J. CRANE, citizens of the United States, and residents, respectively, of Wilkinsburg and Swissvale, both in the county of Allegheny and State of Pennsylvania, have invented a new and useful Improvement in Composition of Matter, of which the following is a specification.

Our invention relates to insulating cements, and it has for its object to provide a sealing wax or cement which shall be adapted for rigidly securing the leads of electrical apparatus, such as transformers, in position.

Our improved cement consists, in general, of a mixture of brick dust and resinous substances in approximately equal proportions. The specific combination of ingredients which we prefer is as follows:

| | |
|---|---|
| Brick dust | 40 parts by weight |
| Powdered rosin | 29 " " " |
| Powdered kaolin (china clay) | 18 " " " |
| Asphalt (high melting point) | 13 " " " |

The brick dust is preferably poured through a screen of number fifty mesh, and it is then thoroughly mixed with the proper proportions of powdered rosin or other resinous material, and powdered kaolin, which is preferably a hydrous aluminum silicate and is also known as china clay. This mixture is heated in an iron vessel until the rosin melts, and then the asphalt or impregnating gum, previously melted in a separate receptacle, is poured into the mixture and the whole stirred until thoroughly mixed. In melting the rosin, heat should be applied gradually, care being taken to prevent the rosin from sticking to the walls of the vessel in which it is contained. Bubbling on the surface of the mixture indicates the presence of moisture and the cement should be kept in its molten state until all bubbling ceases.

The asphalt may be Cimerian gum, hydrolene B, having a melting point of 260° F., or other suitable hydro-carbon impregnating gum.

We claim as our invention:

1. A composition of matter comprising ingredients in substantially the following proportions: rosin, 29 parts by weight; brick dust, 40 parts; china clay, 18 parts; and asphalt having a high melting point, 13 parts.

2. An insulating cement which consists of rosin, 29 parts by weight; brick dust, 40 parts; kaolin (china clay), 18 parts; hydrolene B (melting point 260° F.), 13 parts.

3. A composition of matter comprising ingredients in substantially the following proportions: powdered rosin, 29 parts by weight; brick dust, 40 parts; powdered china clay, 18 parts, and asphalt having a high melting point, 13 parts.

In testimony whereof, we have hereunto subscribed our names this 30th day of December, 1907.

TILLMAN D. LYNCH.
JOHN J. CRANE.

Witnesses:
EDWIN E. NOLAN,
BIRNEY HINES.